United States Patent
Deng et al.

(10) Patent No.: US 8,167,484 B2
(45) Date of Patent: May 1, 2012

(54) TEMPERATURE INDICATION PIPE JOINT

(75) Inventors: Hao Deng, Xiamen (CN); Gangqiang Wu, Xiamen (CN)

(73) Assignee: Solex High-Tech Co., Ltd., Xiamen (CN)

( * ) Notice: Subject to any disclaimer, the term of this patent is extended or adjusted under 35 U.S.C. 154(b) by 404 days.

(21) Appl. No.: 12/431,968

(22) Filed: Apr. 29, 2009

(65) Prior Publication Data
US 2010/0276923 A1 Nov. 4, 2010

(51) Int. Cl.
*G01K 1/14* (2006.01)
*G01K 1/16* (2006.01)

(52) U.S. Cl. .................. 374/147; 374/205; 116/216

(58) Field of Classification Search .......... 374/29, 374/30, 44, 43, 134, 141, 147, 148, 100, 374/205–208, 163, 135; 116/216
See application file for complete search history.

(56) References Cited

U.S. PATENT DOCUMENTS

| | | | | |
|---|---|---|---|---|
| 2,475,317 A * | 7/1949 | Gess | ......... | 141/7 |
| 2,603,091 A * | 7/1952 | Lamb | ......... | 374/148 |
| 2,633,747 A * | 4/1953 | Lindstrom | ......... | 374/41 |
| 3,952,594 A * | 4/1976 | McMahan | ......... | 374/147 |
| 4,030,360 A * | 6/1977 | Fortune | ......... | 374/147 |
| 4,121,763 A * | 10/1978 | Roberge | ......... | 236/87 |
| 4,135,549 A * | 1/1979 | Baker | ......... | 137/552 |
| 4,305,289 A * | 12/1981 | Cornelison | ......... | 374/206 |
| 4,509,550 A * | 4/1985 | Monk | ......... | 137/551 |
| 4,575,258 A * | 3/1986 | Wall | ......... | 374/104 |
| 4,575,262 A * | 3/1986 | Andersen | ......... | 374/147 |
| 5,018,873 A * | 5/1991 | Bobo | ......... | 374/144 |
| 5,076,709 A * | 12/1991 | Tognotti | ......... | 374/147 |
| 5,829,880 A * | 11/1998 | Diedrich | ......... | 374/208 |
| 5,915,415 A * | 6/1999 | Huang | ......... | 137/551 |
| 6,023,969 A * | 2/2000 | Feller | ......... | 73/204.25 |
| 6,308,582 B1 * | 10/2001 | Bender | ......... | 73/861.57 |
| 6,769,390 B2 * | 8/2004 | Hattori | ......... | 123/195 R |
| 7,192,187 B2 * | 3/2007 | Blichmann | ......... | 374/147 |
| 7,226,207 B2 * | 6/2007 | Feldmeier | ......... | 374/147 |
| 7,341,283 B2 * | 3/2008 | Moses et al. | ......... | 285/226 |
| 7,641,382 B2 * | 1/2010 | Izawa et al. | ......... | 374/4 |
| 2003/0066517 A1 * | 4/2003 | Miyashita et al. | ......... | 123/542 |
| 2006/0231543 A1 * | 10/2006 | Sasaki et al. | ......... | 219/216 |
| 2008/0205481 A1 * | 8/2008 | Faries et al. | ......... | 374/138 |

FOREIGN PATENT DOCUMENTS

| | | |
|---|---|---|
| CN | 200520056948.5 | 7/2006 |
| CN | 200520072341.6 | 8/2006 |
| CN | 200720108996.3 | 2/2008 |
| DE | 20209790 U1 * | 10/2002 |
| JP | 63188019 A * | 8/1988 |
| JP | 06226378 A * | 8/1994 |
| JP | 08303244 A * | 11/1996 |

* cited by examiner

*Primary Examiner* — Gail Verbitsky
(74) *Attorney, Agent, or Firm* — Rabin & Berdo, P.C.

(57) ABSTRACT

A temperature indication pipe joint, including a shell, wherein a water conduit is arranged in said shell, and including a heat transmission unit which has a first end in said water conduit and a second end connected to the center of a spiral double sheet metal, said spiral double sheet metal further has an indicating needle extended from its other end. By utilizing the double sheet metal to sense the change of temperature and deform accordingly, the water temperature can be indicated, which can reduce the cost and achieve a simpler structure compared to the digital thermometer used before; when rotating the cover of the present invention, the quantity of water stream will be adjusted.

6 Claims, 2 Drawing Sheets

TEMPERATURE INDICATION PIPE JOINT

FIELD OF THE INVENTION

The present invention relates to sanitary ware, more particularly to a temperature indication pipe joint.

BACKGROUND OF THE INVENTION

Wherever in home or public places like hotels or restaurants, hot water are often available by water supply pipe and the water temperature can be adjusted. Ordinarily, people use their own hands to determine whether the water temperature is suitable or not, if it is not, they have to adjust the temperature until it is suitable to use. There have inconveniences in the above mentioned method: firstly, it is uncomfortable to adjusting the temperature by hands whether the water is too hot or too cold; secondly, it would waste water in such adjusting process; thirdly, the water temperature can not be precisely adjusted, it may not keep the same water temperature in the next time.

Chinese Patent Number CN200520072341.6 titled "Tap with Temp Data Display", it can sense water temperature by using the temperature sensor, then display the water temperature by digital thermometer. Chinese Patent Number CN200720108996.3, titled "Water Tap Displaying Temperature" has the much the same structure. Chinese Patent Number CN200520056948.5 titled "Temp Displaying Water Tap", which discloses a temperature sensor wherein the predetermined color on the outer surface of the outflow pipe will be changed according to the change of temperature. There are many similar techniques.

SUMMARY OF THE INVENTION

The present invention provides a temperature indication pipe joint, the main object is to realize the function of indicating the water temperature in water pipe with a simpler structure and lower cost.

The solution of the present invention is: A temperature indication pipe joint, including a shell, wherein a water conduit is arranged in said shell, and including a heat transmission unit which has a first end in said water conduit and a second end connected to the center of a spiral double sheet metal, said spiral double sheet metal further has an indicating needle extended from its other end.

Said shell has a mandrel inside, the mandrel is a cylinder having an open end and a closed end, said open end by which the water is admitted into said water conduit, a water outlet of said water conduit is arranged on the sidewall of said mandrel, said closed end has a cover, wherein a embedded plate is embedded in the center of said cover, a screw is fastened inside said embedded plate, said screw goes through said closed end of mandrel while the cap of said screw remained inside said water conduit, the screw and embedded plate constitute said heat transmission unit while said embedded plate has a external end connected to said double sheet metal.

Said mandrel has a rotatable water retaining plate of cylindrical surface, wherein an opening is disposed on said water retaining plate corresponding to the position of said water outlet, said water retaining plate is connected to said embedded plate by said screw, the closed end of said mandrel being sandwiched between said water retaining plate and said cover.

A friction ring is arranged between the periphery of said cover and said shell.

The outside of said cover has a transparent cap to cover said double metal sheet and indicating needle.

Based on the description of the structure of the present invention, the present invention has such advantages compared to the prior art: firstly, the function of indicating temperature is realized by using double sheet metal to sense the temperature and deform accordingly, which can achieve a lower cost and a simpler structure than the digital thermometer used before; secondly, rotating the cover of present invention would serve the purpose of adjusting the quantity of water stream.

DETAILED DESCRIPTION OF THE PREFERRED EMBODIMENTS

Please refer to Figs to understand the detailed description of the preferred embodiments of the present invention.

Figure 1:
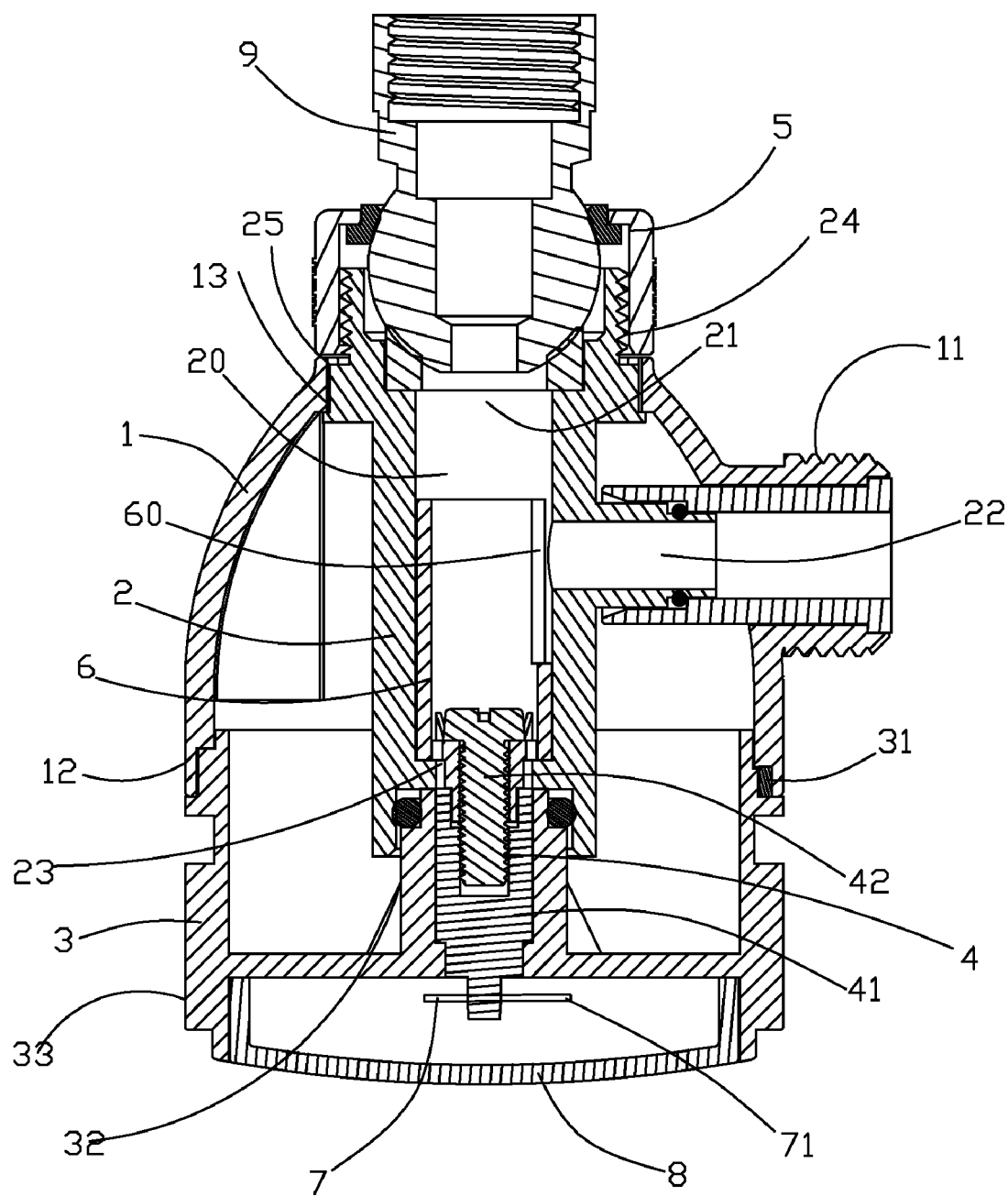
FIG. 1 is a sectional view of the present invention.
Figure 2:
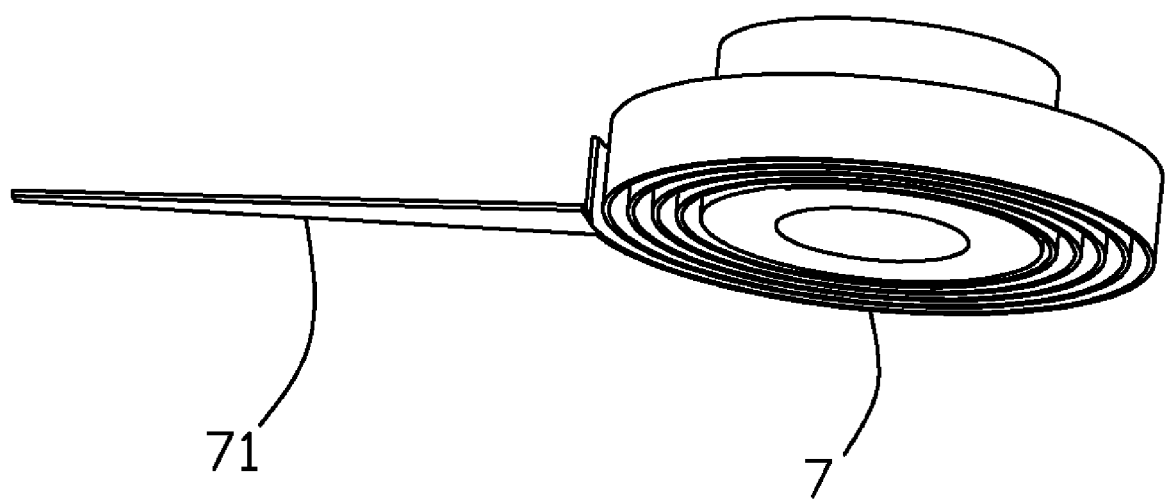
FIG. 2 is a three-dimensional view of the double sheet metal of the present invention.

A temperature indication pipe joint as shown in FIG. 1, including shell 1, mandrel 2, cover 3, heat transmission unit 4, nozzle nut 5, water retaining plate 6, double sheet metal 7, transparent cap 8, spherical joint 9.

The shell 1 is shaped hemispherical, which has water outlet joint 11 extended from one side of said shell, the inside of the bottom shell is arranged in a ladder shape 12, while the top of said shell has a mounting hole 13.

The mandrel 2 is a cylinder having an open end on the top and a closed end at the bottom, said mandrel 2 forms a water conduit 20 inside, said top open end forms the water entrance 21 of said water conduit 20, a water outlet 22 being extended on the sidewall of the water conduit, the bottom end of the mandrel has a through hole 23; the outer wall of the top of the mandrel being a screw thread 24, the bottom of said screw thread 24 being the shaft shoulder 25;

The heat transmission unit 4 includes screw 42 and embedded plate 41, which are all made of materials of fine heat-transfer capability like copper.

The cover 3 is of double cylinder structure, wherein the outside cylinder 33 are coped with shell 1 in shape, the inner cylinder 32 has relatively smaller external diameter than the inner diameter of the bottom of said mandrel 2.

The double sheet metal is spiral-shaped, wherein the center of the double sheet metal is connected to the external of said embedded plate 41, and further has an indicating needle extended from its other end.

The shell 1 is sleeved in the top of the mandrel 2 and locked against the shaft shoulder 25 of the mandrel, the spherical body of the spherical joint 9 is rotatable arranged in the mandrel 2 and be spaced by nozzle nut 5; the water outlet 22 of the mandrel 2 is disposed within the water outlet joint 11 of shell 1; the embedded plate 41 is embedded within the inner cylinder 32 of cover 3, the cap of screw 42 is placed in said water conduit 20 while the bottom end of it goes through the through hole 23 and screwed inside the embedded plate 41, so as to connect the cover 3 and mandrel 2; the top end of the outside cylinder 33 of cover 3 is sleeved with the bottom of shells, the transparent cap 8 is fastened on the bottom of the outside cylinder 33 of cover 3.

There is a rotatable water retaining plate 6 of cylindrical surface disposed in the bottom of the water conduit 20 of said mandrel 2, said water retaining plate 6 has an opening 60 corresponding to the position of said water outlet 22 and screwed on said embedded plate 4 by said screw 42, the bottom end of said mandrel 2 is clamped between said water retaining plate 6 and said cover 3. When rotating the cover 3, the water retaining plate 6 will be caused to rotate too. A friction ring 31 is arrange between the periphery of said cover 3 and said shell 1.

In the operating process, the screw 42 is heated when the water stream goes along the water conduit 20, the thermal power is transmitted to the double sheet metal 7 by embedded plate 4, then double sheet metal are deformed because of different coefficients of expansion between the inside and outside of double sheet metal, the deformation cause the indicating needle 71 to rotate, so as to realize the function of temperature indication.

At the same time, the present invention could also adjust the quantity of outlet water stream by rotating the cover 3. The rotation of cover 3 cause the water retaining plate to rotate too, by adjusting the match degree of the opening on the water retaining plate 6 and the water outlet 22, the quantity of outlet water stream can be adjusted accordingly.

Although specific embodiments have been illustrated and described, it would be apparent to infringe the present invention by making a variety of modifications and changes without departing from the scope of the present invention.

What is claimed is:

1. A temperature indication pipe joint, comprising:
   a shell, wherein a water conduit is arranged in said shell, the said pipe joint further including a heat transmission unit which has a first end in said water conduit and a second end connected to the center of a spiral double sheet metal, said spiral double sheet metal further has an indicating needle extended from its other end; said shell has a mandrel inside, the mandrel is cylinder having an open end and a closed end, said open end by which the water is admitted into said water conduit, a water outlet of said water conduit is arranged on a sidewall of said mandrel, said closed end has a cover, wherein an embedded plate is embedded in the center of said cover, a screw is fastened inside said embedded plate, said goes through said closed end of mandrel while the cap of said screw remained inside said water conduit, the screw and embedded plate constitute said heat transmission unit while said embedded plate has an external end connected to said double sheet metal.

2. The temperature indicated pipe joint of claim 1, is characterized in that: said mandrel has a rotatable water retaining plate of cylindrical surface, wherein an opening is disposed on said water retaining plate corresponding to the position of said water outlet, said water retaining plate is connected to said embedded plate by said screw, the closed end of said mandrel being sandwiched between said water retaining plate and said cover.

3. The temperature indication pipe joint of claim 2, is characterized in that: a friction ring is arranged between the periphery of said cover and said shell.

4. The temperature indication pipe joint of claim 1, is characterized in that: the outside of said cover has a transparent cap to cover said double metal sheet and indicating needle.

5. The temperature indication pipe joint of claim 1, is characterized in that: said screw of said heat transmission unit and embedded plate are made of copper.

6. The temperature indication pipe joint of claim 1, is characterized in that: said screw of heat transmission unit and embedded plate are made of copper.

* * * * *